US012570297B2

(12) United States Patent
Cerdeiro et al.

(10) Patent No.: US 12,570,297 B2
(45) Date of Patent: Mar. 10, 2026

(54) SYSTEM, METHOD AND SOFTWARE FOR OPERATING A DRIVER ASSISTANCE SYSTEM

(71) Applicant: Bayerische Motoren Werke Aktiengesellschaft, Munich (DE)

(72) Inventors: Mariano Cerdeiro, Munich (DE); Moritz Heite, Munich (DE); Dirk Kaule, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 18/681,113

(22) PCT Filed: Aug. 3, 2022

(86) PCT No.: PCT/EP2022/071876
§ 371 (c)(1),
(2) Date: Feb. 5, 2024

(87) PCT Pub. No.: WO2023/012243
PCT Pub. Date: Feb. 9, 2023

(65) Prior Publication Data
US 2025/0222939 A1 Jul. 10, 2025

(30) Foreign Application Priority Data
Aug. 5, 2021 (DE) ..................... 10 2021 120 391.0

(51) Int. Cl.
B60W 50/023 (2012.01)
B60W 50/00 (2006.01)

(52) U.S. Cl.
CPC ...... B60W 50/0098 (2013.01); B60W 50/023 (2013.01); B60W 2520/10 (2013.01);
(Continued)

(58) Field of Classification Search
CPC ........... B60W 30/0953; B60W 30/146; B60W 50/023; B60W 50/029; B60W 50/045;
(Continued)

(56) References Cited

U.S. PATENT DOCUMENTS

2015/0012166 A1 1/2015 Hauler et al.
2017/0108865 A1 4/2017 Rohde et al.
(Continued)

FOREIGN PATENT DOCUMENTS

DE 10 2013 213 169 A1 1/2015
DE 10 2014 221 007 A1 4/2016
(Continued)

OTHER PUBLICATIONS

International Search Report (PCT/ISA/210) issued in PCT Application No. PCT/EP2022/071876 dated Nov. 30, 2022 with English translation (4 pages).
(Continued)

*Primary Examiner* — Peter D Nolan
*Assistant Examiner* — Ci Li Li
(74) *Attorney, Agent, or Firm* — Crowell & Moring LLP

(57) ABSTRACT

Methods, systems, and apparatuses are provided for operating a driver assistance system of a vehicle. A first subsystem is configured to generate a first environment model and plan one or more first trajectories for the vehicle based on the first environment model. A second subsystem is configured to generate a second environment model and plan one or more second trajectories for the vehicle based on the second environment model. The first and second subsystems are each configured to perform a safety assessment both for the one or more first trajectories and for the one or more second trajectories based on a metric.

10 Claims, 3 Drawing Sheets

(52) U.S. Cl.
CPC ............... *B60W 2554/4041* (2020.02); *B60W 2554/4042* (2020.02); *B60W 2554/802* (2020.02)

(58) Field of Classification Search
CPC ......... B60W 60/0011; B60W 60/0015; B60W 60/0017; B60W 2050/0006; B60W 2050/0292; B60W 2520/10; B60W 2552/10
See application file for complete search history.

(56) References Cited

U.S. PATENT DOCUMENTS

| | | | | |
|---|---|---|---|---|
| 2018/0052453 | A1* | 2/2018 | Poledna | G05B 19/042 |
| 2018/0105259 | A1* | 4/2018 | Cahill | B64C 25/42 |
| 2018/0292834 | A1* | 10/2018 | Kindo | G01C 21/3415 |
| 2021/0107516 | A1* | 4/2021 | Fujita | B60W 30/146 |
| 2024/0101154 | A1* | 3/2024 | Edling | B60W 60/0015 |

FOREIGN PATENT DOCUMENTS

| | | |
|---|---|---|
| DE | 10 2015 220 360 A1 | 4/2017 |
| DE | 10 2021 000 369 A1 | 3/2021 |

OTHER PUBLICATIONS

German-language Written Opinion (PCT/ISA/237) issued in PCT Application No. PCT/EP2022/071876 dated Nov. 30, 2022 with English translation (8 pages).

German-language Search Report issued in German Application No. 10 2021 120 391.0 dated Apr. 7, 2022 with partial English translation (12 pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

* cited by examiner

2

SYSTEM, METHOD AND SOFTWARE FOR OPERATING A DRIVER ASSISTANCE SYSTEM

BACKGROUND AND SUMMARY

The present subject matter relates to a system and a method for operating a driver assistance system of a vehicle. In addition, the present subject matter relates to a software containing program code for performing such a method when the software runs on one or more software-controlled computing apparatuses.

The present subject matter may be employed in particular as part of a driver assistance system (DAS), wherein the longitudinal and/or lateral guidance of the vehicle is controlled in such a way that a driving task predefined by the DAS is accomplished. The DAS may facilitate at least partially automated driving, possibly through to fully automated driving, of the vehicle.

Within the context of the document, the term "automated driving" is understood to mean driving with automated longitudinal and/or lateral guidance. Automated driving may involve, for example, driving on the freeway for a longer period of time or driving for a limited period of time during parking. The term "automated driving" comprises automated driving with any degree of automation. Illustrative degrees of automation are assisted, partially automated, highly automated, fully automated and autonomous driving (with an increasing degree of automation in each case). The aforementioned five degrees of automation correspond to SAE levels 1 to 5 of the SAE J3016 (SAE-Society of Automotive Engineering) standard. In assisted driving (SAE level 1), the system performs longitudinal or lateral guidance in certain driving situations. In partially automated driving (SAE level 2), the system takes over the longitudinal and lateral guidance in certain driving situations, the driver needing to constantly monitor the system as in the case of assisted driving. In highly automated driving (SAE level 3), the system takes over the longitudinal and lateral guidance in certain driving situations without the driver having to constantly monitor the system; the driver must be able to take over the vehicle guidance within a certain time at the request of the system, however. In fully automated driving (SAE level 4), the system takes over the vehicle guidance in certain driving situations, even if the driver does not react to a request for intervention, and so the driver is dispensed with as a fallback level. In autonomous driving (SAE level 5), the system may perform all aspects of the dynamic driving task under any roadway and surroundings conditions that a human driver can also deal with. SAE level 5 therefore corresponds to driverless driving, in which the system can automatically cope with all situations throughout the journey in the same way as a human driver; a driver is generally no longer necessary.

When developing DASs that allow automated driving, a central safety aim is reliable validation of planned vehicle trajectories in respect of their safety. This applies in particular to DASs from SAE level 3 upward, since here the driver is no longer available as a corrective that continuously monitors the system. Such advanced DASs are therefore sometimes required to have protection based on ASIL (Automotive Safety Integrity Level) integrity level D according to ISO 26262. The challenge here is firstly to reliably protect sometimes very demanding DAS functions, such as e.g. the automated performance of an overtaking maneuver, and secondly to restrict the availability of functions as little as possible as a result.

Against this background, it is an object of the present subject matter to specify a system and a method for operating a DAS that comprises reliable and at the same time efficient protection of trajectory planning.

The object is achieved by a system and a method according to the independent patent claims. Advantageous examples are specified in the dependent claims.

It is pointed out that additional features of a patent claim that is dependent on an independent patent claim are able, without the features of the independent patent claim or only in combination with a subset of the features of the independent patent claim, to form a separate present subject matter that is independent of the combination of all the features of the independent patent claim and that can be turned into the subject matter of an independent patent claim, a divisional application or a subsequent application. This applies in the same manner to technical teachings described in the description that are able to form a present subject matter which is independent of the features of the independent patent claims.

A first aspect of the present subject matter relates to a system for operating a driver assistance system of a vehicle. The vehicle is sometimes also referred to as an ego vehicle below.

The vehicle may be in particular a motor vehicle. The term motor vehicle may be understood to mean in particular a land vehicle moved by machine force without being tied to railroad tracks. A motor vehicle in this context may be in the form of e.g. a motor car, motorcycle or tractor.

The vehicle is equipped with a driver assistance system (DAS). The DAS may be configured to perform functions as part of at least partially automated driving, such as e.g. an ACC function (i.e. combined speed and distance control), a lane change assist (LCA) function, a steering and lane control assist (SLCA), a park assist function or the like.

In particular, the DAS may be configured to facilitate automated driving from SAE level 3 (i.e. at least highly automated driving) upward.

The system comprises a first subsystem, which is configured to generate a first environment model and to plan one or more first trajectories for the vehicle on the basis of the first environment model. Furthermore, the system comprises a second subsystem, which is configured to generate a second environment model and to plan one or more second trajectories on the basis of the second environment model. The first subsystem and the second subsystem are each configured to perform a safety assessment both for the one or more first trajectories and for the one or more second trajectories on the basis of a (in particular on the basis of the same) metric.

In this case, the present subject matter is based on the idea that reliable and efficient protection of planned trajectories as part of a DAS may be facilitated as a result of there being able to be provision for two or more "channels". By way of example, the first subsystem may also be referred to as a primary ASIL channel or "PAC" for short, and the second subsystem may also be referred to as a secondary ASIL channel or "SAC" for short. The different channels each independently create an environment model and plan one or more trajectories on the basis thereof. The multiple trajectories are alternatives to one another, i.e. they are provided e.g. for the same temporal planning horizon for the trajectory planning of the vehicle.

In addition, the channels assess both their own trajectories and the trajectories planned by the other channel(s) on the basis of a metric, e.g. using defined "safety scores". The channels may have been developed e.g. on the basis of similar specifications, but preferably completely independently of one another. This allows so-called common cause errors to be avoided.

Since the different channels, as mentioned, may have been developed independently of one another, the trajectory strategies used may differ from one another. In such a case, it would therefore not be expedient to perform a safety assessment by checking whether trajectories of different channels are identical. This is because the aim of the concept proposed here is not to make the driving and trajectory strategies of the different channels match, for example. Rather, the trajectories according to the concept proposed here are each intended to be assessed by the at least two channels on the basis of a unique metric, this safety assessment subsequently being able to be considered when selecting the trajectory that is actually to be implemented.

In principle, the system may also comprise more than two, such as e.g. three, such channels or subsystems. However, there must be at least two channels, in the form of the first subsystem and the second subsystem.

The first subsystem and the second subsystem may be configured to generate the respective environment model in particular on the basis of environment sensor data provided by an environment sensor system of the vehicle. Furthermore, navigation system data, map data, etc., for example, may also be considered as the basis for the respective environment model.

The first subsystem and the second subsystem may resort wholly or in part to the same data (such as e.g. environment sensor data) as the basis for their respective environment model and in particular may use environment sensor data that come wholly or in part from the same environment sensors of the vehicle. The actual generation of the environment model on the basis of these data takes place in the second subsystem independently of the first subsystem, however. There are also conceivable examples in which the data used as a basis for generating the respective environment model are provided wholly or in part from different sources, such as e.g. from different environment sensors, in particular environment sensors that are based on different physical measurement principles.

The first subsystem and the second subsystem may e.g. each comprise one or more computing apparatuses, such as e.g. electronic control units, that are configured, i.e. in particular programmed, to generate the respective environment model, to plan the respective trajectory/ies and to perform the safety assessments. The computing apparatus(es) may execute corresponding software modules, such as e.g. a first or second environment model module of the first or second subsystem, a first or second trajectory planner of the first or second subsystem and a first or second validator of the first or second subsystem.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

The trajectory planners are each configured to ascertain specified trajectory variables for a trajectory of the vehicle. The specified trajectory variables may be determined in particular on the basis of a driving task, e.g. predefined by a DAS.

The validators are each configured to assess the safety of the first and the second trajectory/ies on the basis of the metric.

A trajectory to be assessed may be available in the form of a list of points in space and time. The trajectory may contain a starting position and a starting timestamp. By way of example, a planned trajectory may be a list of points associated with successive times in a two-dimensional Cartesian coordinate system that starts at the current vehicle position and extends into the future via a defined time horizon, which may be e.g. at least 4.5 seconds and a maximum of 6 seconds long.

According to one example, the system comprises one or more first computing apparatuses and one or more second computing apparatuses, which are different than the first computing apparatus(es). The first subsystem is configured to perform the generation of the first environment model, the planning of the first trajectory/ies and the performance of the safety assessment using the one or more first computing apparatuses. The second subsystem is configured to perform the generation of the second environment model, the planning of the second trajectory/ies and the performance of the safety assessment using the one or more second computing apparatuses. In other words, there may be provision for the first subsystem and the second subsystem to perform the generation of the respective environment model, the planning of the respective trajectory/ies and the performance of the safety assessments independently of one another in terms of hardware. Such hardware diversity allows common cause errors to be prevented even more reliably.

In general, there may be provision for the first subsystem and the second subsystem to be implemented as ASIL-decomposed systems. This means that hardware and software diversity ensures the most independent possible operation of the subsystems, in particular as regards the environment model generation, the trajectory planning and the safety assessment.

According to a preferred example, the performance of the safety assessment comprises assigning a numerical safety value in accordance with the metric to each of the first and second trajectories. This safety value is sometimes also referred to by the term "safety score" below. By way of example, the safety score may be defined such that it ends up being higher the more unsafe the relevant trajectory in view of possible collisions.

The safety score may include e.g. in particular information about the probability of the trajectory under consideration being collision-free or at least free of collisions from a specific damage severity upward. A distinction may be drawn in this case between possible collisions having different expected damage severities, such as e.g. the potential damage severities S0, S1, S2, S3, . . . , according to ISO standard 26262 relating to functional safety for production vehicles. However, definitions of damage severities that deviate from this standard may also be used.

By way of example, according to one example, collisions for which the speed difference between the ego vehicle and the collision object is less than 60 km/h fall into category S0 or S1; the damage severity S2 is assumed for a speed difference in the range from 60 km/h to 70 km/h; and for speed differences greater than 70 km/h, a damage severity S3 or higher (damage severity "S3+") is assumed. This illustrative definition of damage severities S0, S1, S2, S3+ may apply e.g. in particular on freeways or freeway-like roads, such as for example German major roads, where the presence of pedestrians is not expected in the region of the roadway. In other regions, e.g. in downtown traffic, different definitions may apply, since in the case of a collision with a pedestrian for example just a vehicle speed of 5 km/h attains damage severities such as S2 or S3.

By way of example, the first subsystem and the second subsystem may be configured to determine the respective safety value on the basis of a time statement that indicates how much time would remain (taking account of the respective environment model and optionally other ego vehicle data) for taking measures to avoid a collision of a defined damage severity with an object in the vehicle environment when travelling along the respective trajectory. The time statement may also be referred to by the term time to react (TTR for short). Specific TTRs referenced to a respective damage class, such as e.g. SO, S1, S2, S3, may be significant in this case. As such, e.g. a time statement $TTR_{Si}$ (where i=0, 1, 2, 3, . . . ) may convey how much time remains for countermeasures in order to prevent a collision having the damage severity $S_i$ (e.g. by braking). This makes it possible e.g. to distinguish how much time remains to prevent a collision entirely and how much time remains to prevent a (probably) fatal collision.

In this case, the present subject matter is based on the idea of assuming not just a time to collision (TTC for short) as the fundamental basis for the safety assessment of a planned trajectory, but rather one or more TTRs or $TTR_{SiS}$—preferably classified according to potential damage severity. This allows a nuanced safety assessment to be produced.

The safety value associated with a trajectory as part of the safety assessment may be computed on the basis of multiple different $TTR_{SiS}$ (e.g. where i=0, 1, 2, 3), with e.g. a weighting of respective terms (which take account of the $TTR_{SiS}$ where i=0, 1, 2 or 3) being able to be performed using different coefficients. When computing the safety value, e.g. a term that takes account of a time statement associated with a comparatively high damage severity, such as e.g. $TTR_{S3}$, may be weighted significantly higher than a term having a comparatively low damage severity, such as e.g. $TTR_{S1}$, since the maxims of minimizing the risk of personal damage naturally always apply. It is also possible for the different coefficients to be empirically matched ("fitted") to as safe and at the same time comfortable a driving behavior as possible.

Furthermore, a "minimum time to react" $MTTR_{Si}$, i.e. a threshold value indicating a minimum time that is only just acceptable and must always remain for measures to prevent a collision having the potential damage severity $S_i$, may be significant for computing the safety value. When computing the safety value, a $TTR_{Si}$ may be mathematically expressed in relation to an $MTTR_{Si}$, such as e.g. in the form of a difference between two variables that appears in the exponent of an exponential function.

By way of example, according to one example, the (total) safety value Score is computed from multiple partial safety values $Score_{Si}$ (e.g. where i=1, 2, 3+), which each relate to a potential damage severity $S_i$, as follows:

$$Score = \sqrt{Score_{S1}^2 + Score_{S2}^2 + Score_{S3+}^2}$$

Here, the partial safety values $Score_{Si}$ may each be computed on the basis of the $TTR_{Si}$ associated with the trajectory under consideration and a respective $MTTR_{Si}$ as $$Score_{Si} = a_{i1} e^{(MTTR.Si - TTR.Si)} * a_{i2} e^{-\lambda * TTR.Si}.$$

The factors $\alpha_{i1}$, $\alpha_{i2}$ and $\lambda$ may be adapted for any validator and may be used in particular as an opportunity to align the computation of the safety score in both validators in order to obtain almost the same result for the safety score for a given trajectory of both validators. Due to different environment models and slightly different inputs, certain variances between the computations are generally to be expected.

In practice, the partial safety values $Score_{Si}$ for a respective $TTR_{Si}$ may be computed as an input e.g. using a lookup table in order to save computation time.

According to one example, the first subsystem and the second subsystem are configured to determine the respective safety value on the basis of a speed of the ego vehicle, a speed of a vehicle travelling in front of the ego value and a distance between the ego vehicle and the vehicle travelling in front of the ego vehicle.

By way of example, in particular the $TTR_{Si}$ may be determined on the basis of such physical parameters and a definition of the different damage severities assuming a worst-case scenario. As such, it may be assumed e.g. in a worst-case scenario that a vehicle travelling ahead appears at the end of the horizon and then brakes abruptly with a negative acceleration of 10 ms$^{-2}$, to which the ego vehicle may react by braking at (a maximum of) 6 ms$^{-2}$.

The reference considered for computing the safety value may be e.g. a scenario of the following type, which is regarded as safe: two vehicles are travelling one behind the other in the same lane at a speed of 130 km/h. The distance between the two vehicles is 65 meters (half the speed in meters), which is classified as safe.

It is furthermore part of the present subject matter that the safety value may be computed on the basis of object types. This means that e.g. a trajectory that, given a specific TTR, involves the risk of a collision at a speed of 10 km/h with a vulnerable road user VRU receives a much worse safety assessment than a trajectory that entails the risk of a collision with another motor vehicle given the same speed and the same TTR.

Since any trajectory to be assessed generally comprises multiple points, there may be provision for a safety score to be computed for each point within the trajectory, the maximum computed safety score for all points being regarded as the safety score of the trajectory and optionally being output to a selector for further processing, as described below.

According to one development, the system furthermore comprises a third subsystem, wherein the first subsystem and the second subsystem are each configured to output a result of the safety assessment(s) to the third subsystem, and wherein the third subsystem is configured to use the results of the safety assessments to select one of the planned first or second trajectories and to output it to a control system of the driver assistance system, such as e.g. to a trajectory servo controller. In line with its function of selecting a trajectory, the third subsystem may also be referred to as a selector.

The third subsystem may comprise e.g. one or more computing apparatuses on which a software module for selecting a trajectory is executed. In this case, to avoid common cause errors, it is preferred for the computing apparatus(es) that the third subsystem uses to be separate from the computing apparatuses that the first and second subsystems use.

Since the selector itself does not need to process e.g. environment sensor information or detailed trajectory data, but rather may make its selection merely on the basis of the safety assessments transmitted to it, it may be of comparatively simple design in terms of hardware and software. Against the background that a certain trade-off between the complexity and reliability of a system may usually be assumed, the division of labor proposed here for the three separate subsystems therefore permits a comparatively reliable design for all three subsystems, specifically in particular the selector, which is kept comparatively simple.

By way of example, there may be provision for the first subsystem and the second subsystem with their respective functions, i.e. the environment model generation and the planning and assessment of first and second trajectories, to each meet the functional safety requirements according to ASIL B. Following the selection of a trajectory from the independently planned first and second (alternative) trajectories using the particularly reliable (and inherently less complex) third subsystem, the function may then by and large satisfy ASIL D. This allows in particular even DAS functions from SAE level 3 upward to be protected efficiently and reliably.

According to one example, the third subsystem is configured to compare the safety value associated with the first subsystem with the safety value associated with the second subsystem for each of the first and second trajectories. In this case, there may in particular be provision for the third subsystem to be configured to assess those first or second trajectories for which the respective safety value assigned by the first subsystem differs from the respective safety value assigned by the second subsystem by less than a predetermined permissible difference as valid trajectories for the purposes of further processing as part of the DAS. In other words, an integrity check on the planned trajectories may thus be performed by checking whether the two independent channels are "united" in the sense that they assess a considered trajectory at least approximately with the same safety score. If this is the case, the relevant trajectory is considered to be valid and is suitable as a candidate for the real implementation as part of the DAS.

The third subsystem (i.e. the selector) may furthermore be configured to select the trajectory to be output to the control system of the DAS (and actually to be implemented thereby) from the trajectories that have been assessed as valid on the basis of the safety values assigned to the trajectories that have been assessed as valid. In this case, a prioritization by the first subsystem and/or the second subsystem, in particular by the subsystem that has planned the relevant trajectory, may be used as a criterion for selecting a specific trajectory to be output from multiple valid trajectories. There may thus be provision for information relating to a prioritization to be provided to the selector by the first and/or second subsystem in addition to the safety scores.

By and large, the selector may therefore be configured to initially use a comparison of the safety assessments by the first subsystem and by the second subsystem to select multiple valid trajectories from multiple planned trajectories and, in a further step, to select a trajectory to be output to the control system of the DAS (and actually to be implemented thereby) from the valid trajectories on the basis of the safety assessments and/or of prioritization information provided by the first subsystem and/or by the second subsystem.

A second aspect of the present subject matter is a method for operating a driver assistance system of a vehicle, comprising the steps of:

generating, using a first subsystem, a first environment model;

planning, using the first subsystem, one or more first trajectories for the vehicle on the basis of the first environment model;

generating, using a second subsystem, a second environment model;

planning, using the second subsystem, one or more second trajectories for the vehicle on the basis of the second environment model;

performing, using the first subsystem, a safety assessment both for the one or more first trajectories and for the one or more second trajectories; and performing, using the second subsystem, a safety assessment both for the one or more first trajectories and for the one or more second trajectories.

The method according to the second aspect of the present subject matter may be carried out using a system according to the first aspect of the present subject matter. Examples of the method according to the present subject matter may therefore correspond to the advantageous examples of the system according to the present subject matter that are described above and below, and vice versa.

A third aspect of the present subject matter is a software containing program code for performing the method according to the second aspect of the present subject matter when the software runs on one or more software-controlled computing apparatuses. In particular, the software may be used to provide a first, second and optionally third subsystem, as described in the present document in connection with the system according to the first aspect of the present subject matter. The software may also be set up for multiple separate subroutines that interact with one another in accordance with the interaction of the various subsystems that is described here. According to some examples, the software may thus comprise multiple parts that may each be executed on different computing apparatuses (such as e.g. multiple processors), which are optionally spatially remote from one another.

By way of example, a system according to the first aspect of the present subject matter may comprise one or more computing apparatuses on which a software according to the third aspect of the present subject matter is able to be executed.

A fourth aspect of the present subject matter is a nontransitory computer-readable (storage) medium on which a software according to the third aspect of the present subject matter is stored.

A fifth aspect of the present subject matter is a vehicle having a system according to the first aspect of the present subject matter.

The present subject matter is now explained in more detail on the basis of examples and with reference to the accompanying drawings. The features and combinations of features that are cited in the description above or below and/or that are shown in the drawings alone are able to be used not only in the specific indicated combination but also in other combinations or on their own without departing from the scope of the present subject matter.

DETAILED DESCRIPTION OF THE DRAWINGS

Figure 1:
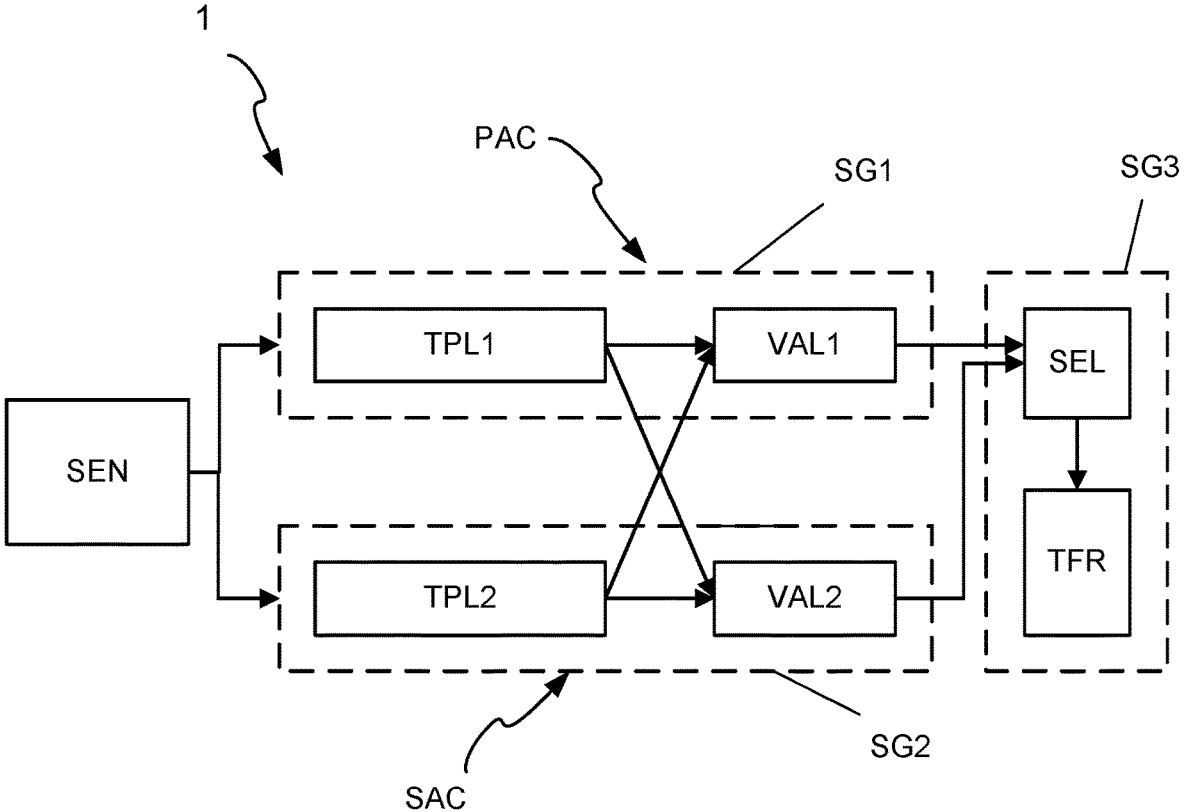
FIG. 1 illustrates a system for operating a driver assistance system of a vehicle by way of illustration and schematically.
Figure 2:
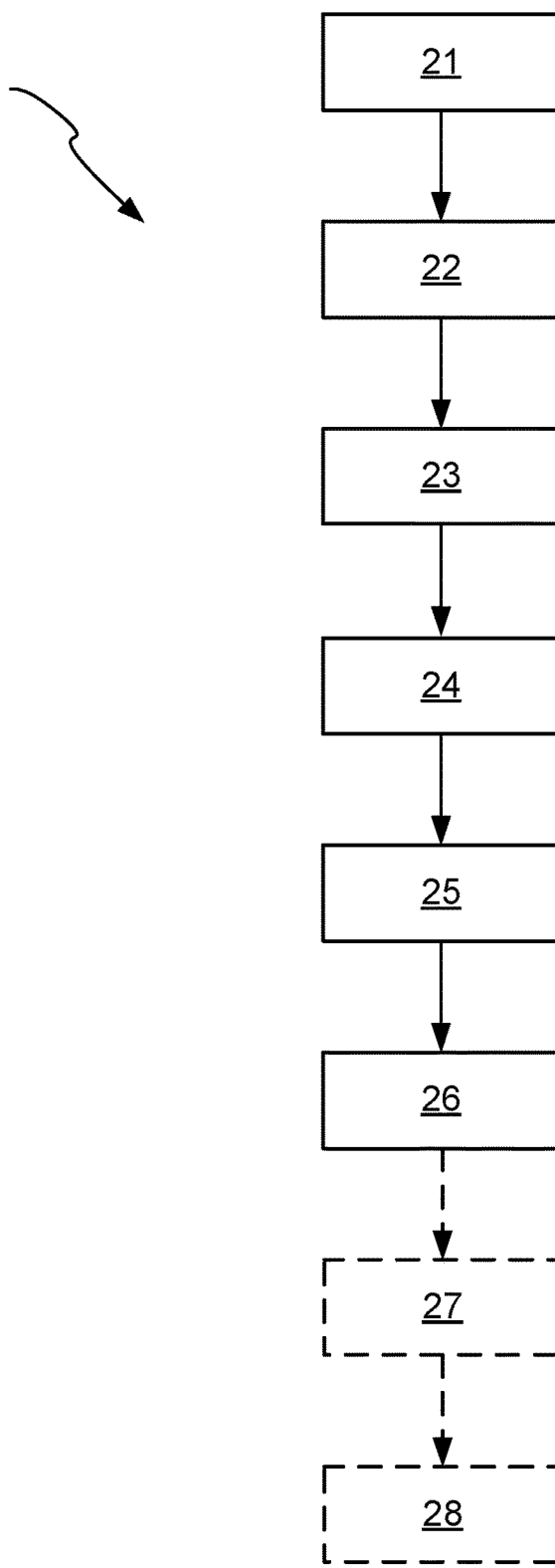
FIG. 2 shows a schematic flowchart for a method for operating a driver assistance system of a vehicle.

The example shown in FIG. 1 for a system 1 for operating a DAS of a vehicle 3 is explained below, reference immediately also being made to steps 11-13 of a corresponding method 2, which are illustrated in FIG. 2 in the form of a block diagram.

The system 1 comprises a first subsystem PAC, a second subsystem SAC and a third subsystem SEL.

The first subsystem PAC, which may also be referred to as a "Primary ASIL Channel", is configured to receive environment sensor data from an environment sensor system SEN of the vehicle 3 and to take the environment sensor data as a basis for generating a first environment model. This is consistent with method step 21 in FIG. 2: generate 21, using a first subsystem PAC, a first environment model.

Furthermore, the first subsystem PAC is configured to plan one or more first trajectories for the vehicle 3 on the basis of the first environment model. This is consistent with method step 22 in FIG. 2: plan 22, using the first subsystem PAC, one or more first trajectories for the vehicle 3 on the basis of the first environment model.

To accomplish its trajectory planning task, the first subsystem PAC comprises a first trajectory planner TPL1.

Entirely analogously to the description above with reference to the first subsystem PAC, the second subsystem SAC, which may also be referred to as a "Secondary ASIL Channel", is configured to receive environment sensor data from the environment sensor system SEN and to take the environment sensor data as a basis for generating a second environment model. This is consistent with method step 23 in FIG. 2: generate 23, using a second subsystem SAC, a second environment model.

Furthermore, the second subsystem SAC is configured to use a second trajectory planner TPL2 to plan one or more second trajectories for the vehicle 3 on the basis of the second environment model, in accordance with method step 24 in FIG. 2: plan 24, using the second subsystem SAC, one or more second trajectories for the vehicle 3 on the basis of the second environment model.

In addition, the first subsystem PAC and the second subsystem SAC are each configured to perform a safety assessment both for the one or more first trajectories and for the one or more second trajectories on the basis of a defined metric. This is consistent with method steps 25 and 26 in FIG. 2: perform 25, using the first subsystem PAC, a safety assessment both for the one or more first trajectories and for the one or more second trajectories; and perform 26, using the second subsystem SAC, a safety assessment both for the one or more first trajectories and for the one or more second trajectories. The performance 25, 26 of each of the safety assessments comprises assigning a numerical safety value in accordance with the metric to each of the first and second trajectories.

To validate a trajectory, the first subsystem PAC preferably uses its specific most current available environmental model, which is based on the most current available environment sensor data. In particular, there may be provision to use a specific last available environment sensor data status that is older than a start timestamp of the trajectory to be validated. The same applies to the validation by the second subsystem SAC.

The first subsystem PAC and the second subsystem SAC are furthermore each configured to output the result of the safety assessment(s) to the third subsystem SEL.

The third subsystem SEL, which may also be referred to as a selector, is configured to use the results of the safety assessments to select one of the planned first or second trajectories and to output it to a control system of the DAS. In the present example, the control system of the DAS comprises a trajectory servo controller TFR, to which the selector SEL transfers the selected trajectory as the specified trajectory for vehicle guidance. This is consistent with optional (and therefore shown in dashed lines) method steps 27 and 28 in FIG. 2: select 27, using a third subsystem SEL, on the basis of a result of the safety assessments, one of the planned first or second trajectories; and output 28 the selected trajectory from the third subsystem SEL to a control system TFR of the DAS.

In the example, the functions of the first subsystem PAC are performed on a first computing apparatus in the form of a first electronic control unit SG1, and the functions of the second subsystem SAC are performed on a separate second computing apparatus in the form of a second electronic control unit SG2. The electronic control units SG1, SG2 are thus in particular programmed to generate the first or second environment model, to plan the first or second trajectory/ies and to perform the safety assessments, and so the electronic control units SG1, SG2 are able to execute corresponding software modules, such as a first or second environment model module (not shown separately in FIG. 1), the aforementioned first or second trajectory planner TPL1, TPL2 and a first or second validator VAL1, VAL2. The validators VAL1, VAL2 are each configured to assess the safety of the first and the second trajectory/ies on the basis of the metric.

By way of example, the first electronic control unit S1 and the second electronic control unit S2 along with their respective cited functions may have a functional safety integrity according to ASIL B as part of the first subsystem PAC or the second subsystem SAC.

The functions of the third subsystem SEL, i.e. in particular the selection of a trajectory on the basis of the safety assessments, is performed on a third control electronic unit SG3, which is arranged separately from the first electronic control unit SG1 and the second electronic control unit SG2.

By way of example, the third electronic control unit SG2 along with the function that is able to be performed thereon may have a functional safety integrity according to ASIL D as part of the third subsystem SEL. By and large, a functional safety integrity according to ASIL D may then be assumed for the selected trajectory that the selector SEL outputs to the trajectory servo controller TFR, which means that the proposed system is in particular also suitable for DASs from SAE level 3 upward.

Further details in relation to the safety assessment of trajectories that the first subsystem PAC and the second subsystem SAC perform and in relation to the selection of a trajectory by the selector SEL will be explained below on the basis of examples.

There may be provision e.g. for the first trajectory planner TPL1 of the first subsystem PAC to compute multiple, such as e.g. more than 15, alternative trajectories for a specific temporal planning horizon, while the second trajectory planner TPL2 of the second subsystem SAC computes only a single trajectory for a minimum risk maneuver (MRM) for the same period. Nevertheless, the second validator VAL2 also needs to validate all trajectories computed by the first trajectory planner TPL1 in addition to the MRM trajectory, and the first validator VAL1 in turn also needs to validate the MRM trajectory in addition to the multiple trajectories planned by the first trajectory planner TPL1.

Since the second subsystem SAC computes only one MRM trajectory in this example, whereas the first subsystem plans multiple "full-value" (comfort) trajectories, it is obvious that the validation cannot be an identity check between the multiple computed trajectories of the first subsystem PAC and the MRM trajectory of the second subsystem SAC. Rather, both channels, PAC and SAC, assess the safety of their own trajectories and of the trajectories computed by the other channel in respect of possible collisions between the vehicle 3 and objects 4 in the vehicle environment on the basis of a defined metric. A safety score is computed for each trajectory. This results in two safety scores for each trajectory (one safety score from each validator VAL1 and VAL2).

The safety score indicates the probability of the trajectory under consideration being collision-free or at least free of collisions from a certain damage severity upward. A distinction is drawn in this case between possible collisions having different expected damage severities. By way of example, according to one example, collisions for which the speed difference between the ego vehicle 3 and a collision object 4 is less than 60 km/h fall into category S0 or S1; the damage severity S2 is assumed for a speed difference in the range from 60 km/h to 70 km/h; and for speed differences greater than 70 km/h, a damage severity S3 or higher (damage severity "S3+") is assumed.

The first validator VAL1 and the second validator VAL2 are configured to determine the respective safety score on the basis of a time to react TTR, which indicates how much time would remain, taking account of a respective current environment model generated by the PAC or SAC, for taking measures to avoid a collision of a defined damage severity with an object 4 in the vehicle environment when travelling along the respective trajectory. Specific TTRs referenced to a respective damage class, such as e.g. S1, S2, S3+, may be considered in this case. As such, e.g. a time statement $TTR_{Si}$ (where i=1, 2, 3+) may convey how much time remains for countermeasures in order to prevent a collision having the damage severity $S_i$ (e.g. by braking).

Furthermore, a "minimum time to react" $MTTR_{Si}$, i.e. a threshold value indicating a minimum time that is only just acceptable and must always remain for measures to prevent a collision having the potential damage severity $S_i$, may be significant for computing the safety value.

By way of example, according to one example, the (total) safety value Score is computed from multiple partial safety values $Score_{Si}$ (e.g. where i=1, 2, 3+), which each relate to a potential damage severity $S_i$, as follows:

$$Score = \sqrt{Score_{S1}^2 + Score_{S2}^2 + Score_{S3+}^2}$$

Here, the partial safety values $Score_{Si}$ may each be computed on the basis of the $TTR_{Si}$ associated with the trajectory under consideration and a respective $MTTR_{Si}$ as $$Score_{Si} = a_{i1}\, e^{(MTTR.Si - TTR.Si)} * a_{i2} e^{-\lambda * TTR.Si}.$$

The coefficients $\alpha_{i1}$, $\alpha_{i2}$ and $\lambda$ may be adapted for any validator VAL1, VAL2 and may be used in particular as a degree of freedom in order to align the computation of the safety score in both validators VAL1, VAL2 with one another.

Figure 3:
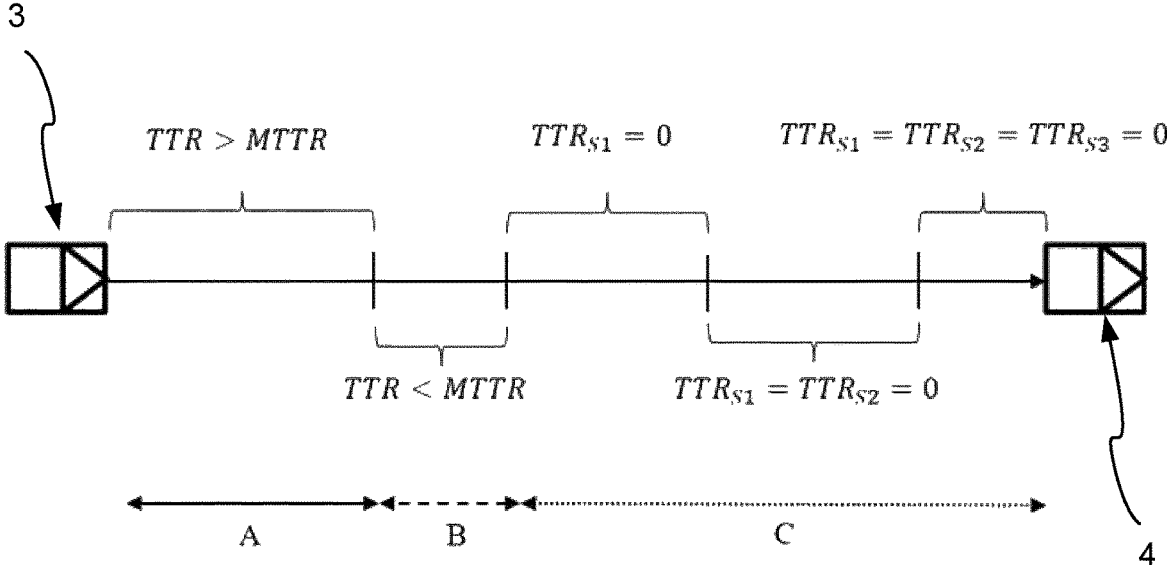
FIG. 3 illustrates relevant variables for computing a safety value for a planned trajectory by way of illustration and schematically.

FIG. 3 shows, by way of illustration and schematically, a scenario in which the ego vehicle 3 has another vehicle 4 travelling ahead of it (as a potential collision object). In this case, the respective safety score of a trajectory may ultimately be determined on the basis of the speed of the ego vehicle 3, the speed of the vehicle 4 travelling in front of the ego vehicle 3 and the distance between the ego vehicle 3 and the vehicle 4 travelling in front of the ego vehicle 3 using the variables $TTR_{Si}$ and $MTTR_{Si}$. By way of example, the $TTR_{SiS}$ may be determined on the basis of these physical parameters and a definition of the different damage severities assuming a worst-case scenario, in which e.g. it is assumed that the vehicle 4 travelling ahead brakes abruptly with a negative acceleration of 10 ms$^{-2}$, to which the ego vehicle 3 may react by braking at (a maximum of) 6 ms$^{-2}$, since this is the maximum implementable deceleration in the event of failure of the main energy supply.

If, by way of example, the two vehicles 3, 4 are each travelling at a speed of 130 km/h at a distance of 65 m one behind the other in the same lane, this may be classified as safe. Such a scenario may be used e.g. for the safety assessment as a reference for a safe situation. If, proceeding from this point, the worst-case scenario described in the paragraph above occurs, then e.g. the following TTRs and MTTRs broken down according to the expected damage severity for a collision may be obtained:

| Damage severity | TTR [s] | MTTR [s] |
|---|---|---|
| S1 | 0.67 | 0.6 |
| S2 | 1.35 | 1.2 |
| S3+ | 2.40 | 2.2 |

In the case of the generic example of a following journey shown in FIG. 3A, the range marked "A" indicates what distance range (under certain speed conditions) may likewise still be regarded as safe, since in this range the TRR is greater than the MTRR and therefore there would still be enough time, even in the assumed worst-case scenario, for countermeasures by the ego vehicle 3 in order to prevent a collision entirely. By contrast, the distance range marked "B" will already have to be assessed as generally unsafe, since here the TRR is less than the MTRR and therefore sudden sharp braking by the vehicle 4 travelling ahead may lead to a collision. The distance range marked "C" has to be assessed as unsafe, since here a collision must already be deemed inevitable in the worst-case scenario (sudden sharp deceleration by the front vehicle 4). This range may also be broken down more precisely according to the expected damage severity of the collision, however: in a first section of the unsafe range C, only $TTR_{S1}$=0. This means that a collision having the damage severity S1 may no longer be avoidable, whereas a collision having the greater damage severity S2 really is. A subsequent section is distinguished by it now also holding that $TTR_{S2}=0$, that is to say that a collision having the damage severity S2 may no longer be avoidable. In a further section, which is distinguished by a very short distance between the ego vehicle 3 and the vehicle 4 travelling ahead, it even holds that $TTR_{S3}=0$, which means that a trajectory that the ego vehicle 3 brings into this section of the range "C" will receive a comparatively poor safety assessment.

To compute the safety scores, the validators VAL1, VAL2 take account of objects and vehicles 4 in the ego lane. Objects outside the lane are ignored according to one example. According to one example, computation of the safety score also does not involve predicting whether or not a vehicle changes lane. Rather, it is assumed for this example that all vehicles maintain their lane and their speed. Vehicles that change to the ego lane are considered only when they cross the roadway marking.

In the case of those objects and vehicles 4 that are situated beyond the range in which the sensors are able to reliably detect the lane profile, the system 1, according to one example, assumes that they are situated in the ego lane (worst-case assumption). By way of example, a distance of 60 m may be defined as a threshold value, the general assumption that the object or vehicle 4 is situated in the ego lane being made from this distance upward.

The significance of the time statements $TTR_{Si}$ and $MMR_{Si}$ will be clarified below as an aid to understanding using two further example scenarios.

In a first example situation, the ego vehicle 3 is travelling on the freeway and approaches the end of a queue. A trajectory is planned accordingly and brings the vehicle 3 to a safe standstill with a continuous deceleration of 4 $ms^{-2}$. If no errors occur in the trajectory planning, and if no other vehicle cuts into the lane of the ego vehicle 3, the $TTC_{SiS}$ at any time are infinite. As the end of the queue is approached, all $TTR_{SiS}$ decrease until the vehicle 3 slows. The $MTTR_{SiS}$ are greater than the corresponding $TTR_{SiS}$. From the point at which the brakes are operated, all $TTR_{SiS}$ increase again. When the vehicle 3 comes to a standstill, all $TTR_{SiS}$ are infinite.

In a second example situation, the ego vehicle 3 is following a vehicle 4 travelling ahead that suddenly slows at a slow rate of 1 $ms^{-2}$. The trajectory of the ego vehicle 3 is not adapted and the brakes are not operated. Initially, all $TTR_{SiS}$ are greater than the corresponding $MTTR_{SiS}$. When the vehicle 4 travelling ahead becomes slower and the ego vehicle 3 approaches, first $TTR_{S0}$ and then also $TTR_{Si}$ converge on 0. The TTRs for higher degrees of severity may remain infinite due to the low difference speed at impact. During the time in which the vehicle 4 travelling ahead and the ego vehicle 3 are travelling at the same speed, the $TTC_{SiS}$ are infinite. As the vehicle 4 travelling ahead slows, the times to collision $TTC_{Si}$ (for i=0, 1) begin to fall and converge on 0 at the moment of impact. $TTC_{S2}$ and $TTC_{S3}$ may remain infinite, caused by the low difference speed at impact.

For each planned trajectory, the selector SEL compares the two associated safety scores (i.e. the safety score allocated by the first validator VAL1 and the safety score allocated by the second validator VAL2) with one another. There may be provision e.g. for the selector SEL to receive the trajectories of both channels, PAC and SAC, and the respective safety assessments cyclically (i.e. e.g. once every 40 ms).

By way of example, the outputs from the first validator 1 and the second validator 2 are combined in a table for the purpose of further processing by the selector SEL. An illustrative table is shown below.

| ID | Source | PAC score | SAC score | Type | PAC Prio |
|---|---|---|---|---|---|
| #1 | PAC | 10 | 20 | comfort | 1 |
| #2 | PAC | 110 | 80 | MRM | 8 |
| #3 | PAC | 2000 | 20 | comfort | 12 |
| #4 | SAC | 30 | 100 | MRM | — |
| #5 | PAC | 90 | 80 | comfort | 3 |
| #6 | Fall-back | 1000 | 950 | MRM | — |
| . . . | . . . | . . . | . . . | . . . | . . . |

As shown, the table may contain e.g. the following details for each trajectory from a plurality of trajectories: a trajectory ID; an indication of the source, i.e. which subsystem planned the trajectory (in particular PAC or SAC or optionally a further, independent fallback channel); the safety score ascertained by the first subsystem (PAC score); the safety score ascertained by the second subsystem (SAC score); a trajectory type (MRM or comfort); and a priority assigned by the PAC (for trajectories planned by the PAC).

The selector SEL is configured to assess only those first or second trajectories for which the respective safety value assigned by the first subsystem PAC differs from the respective safety value assigned by the second subsystem SAC by less than a predetermined permissible difference as valid trajectories for the purposes of further processing. In other words: the two safety scores belonging to a specific trajectory need to be close to one another within a defined framework in order for the trajectory not to be marked as erroneous and weeded out. This is because if the difference between the two safety scores is above a specific threshold value, it is assumed that there is an error in at least one of the channels. Since the selector is not capable of identifying which channel is affected by the error, however, the trajectory is eliminated in this case (i.e. not considered to be valid for further processing), which means that it is ultimately not travelled along by the vehicle.

Based on the example from the table shown above, e.g. the trajectories with IDs #3 and #4 may be eliminated from the list of valid trajectories, since here the PAC score differs significantly from the SAC score. It becomes clear from this example that the aim of this step of the selector SEL is not to find the absolutely safest trajectory from all planned trajectories, for example, but rather to remove from the table those trajectories whose safety scores computed by SAC and PAC are not close to one another in a defined manner.

After the invalid trajectories have been eliminated, the selector SEL needs to select one of the remaining, valid trajectories, which is output to the trajectory servo controller TFR. The selector SEL is configured to select the trajectory to be output from the trajectories that have been assessed as valid on the basis of the safety scores assigned to the trajectories that have been assessed as valid. To this end, specific safety score threshold values may have been defined, each valid trajectory being put into a specific category depending on its safety scores based on the safety score threshold values.

By way of example, there may be provision for the selector SEL to select the trajectory to be output from those trajectories that fall into the highest safety category defined by the safety score threshold values. This is because, when the system is functioning normally, there are e.g. typically multiple alternative trajectories that may be expected to be collision-free and that are accordingly assessed with the same or a sufficiently similar, high safety score by both validators VAL1, VAL2.

If there is no trajectory in the highest safety category, the selector SEL selects the trajectory to be output from the valid trajectories in the next lowest safety category, etc. If the selector SEL does not find a travelable trajectory planned by the first subsystem PAC or the second subsystem SAC after a predetermined period of time, then e.g. an MRM trajectory provided by an independent fallback channel is used.

There may furthermore be provision for the selector SEL to make its selection among the trajectories within a respective category in accordance with a prioritization, which may be created in particular by the first subsystem PAC. As a result, the first subsystem PAC is able to prioritize its computed first trajectories additionally according to comfort. This ranking is considered by the selector SEL by selecting the trajectory having the highest priority (i.e. e.g. having the lowest integral priority value) within the highest available safety category. Based on the table shown above, this means e.g. that if trajectories #2 and #5 of the PAC are both assessed as valid and assigned to the same safety category, the choice by the selector SEL falls on trajectory #5, which is prioritized more highly by the PAC.

What is claimed is:

1. A system for operating a driver assistance system of a vehicle, the system comprising:
   a first subsystem configured to:
      generate a first environment model; and
      plan one or more first trajectories for the vehicle based on the first environment model; and
   a second subsystem configured to:
      generate a second environment model; and
      plan one or more second trajectories for the vehicle based on the second environment model,
   wherein the first subsystem is configured to:
      receive the one or more second trajectories from the second subsystem; and
      perform a safety assessment both for the one or more first trajectories and for the one or more second trajectories based on a metric and using the first environment model generated by the first subsystem;
   wherein the second subsystem is configured to:
      receive the one or more first trajectories from the first subsystem; and
      perform a safety assessment both for the one or more first trajectories and for the one or more second trajectories based on the metric and using the second environment model generated by the second subsystem;
   wherein the system further comprises a third subsystem configured to:
      receive results of the safety assessments from the first subsystem and the second subsystem;
      use the results of the safety assessments to select one of the first or second trajectories; and
      output the selected one of the planned first or second trajectories to a control system of the driver assistance system,
      wherein the control system is configured to actuate one or more actuators of the vehicle to perform an at least partially automated driving maneuver according to the selected one of the first or second trajectories.

2. The system according to claim 1, wherein the system further comprises:
   one or more first computing apparatuses; and
   one or more second computing apparatuses, wherein
      the first and second computing apparatuses are different, and
      the first subsystem is further configured to:
         perform the generation of the first environment model, the planning of the first trajectory/ies and the performance of the safety assessment using the one or more first computing apparatuses, and
      the second subsystem is further configured to:
         perform the generation of the second environment model, the planning of the second trajectory/ies and the performance of the safety assessment using the one or more second computing apparatuses.

3. The system according to claim 1, wherein the third subsystem is further configured to:
   compare the safety value assigned by the first subsystem with the safety value assigned by the second subsystem for each of the first and second trajectories.

4. The system according to claim 3, wherein the third subsystem is further configured to:
   assess those first or second trajectories for which the respective safety value assigned by the first subsystem differs from the respective safety value assigned by the second subsystem by less than a predetermined permissible difference as valid trajectories for the purposes of further processing.

5. The system according to claim 4, wherein the third subsystem is further configured to:
   select the trajectory to be output to the control system of the driver assistance system from the trajectories that have been assessed as valid based on the safety values assigned to the trajectories that have been assessed as valid.

6. The system according to claim 1, wherein
   the performance of the safety assessment comprises assigning a numerical safety value in accordance with the metric to each of the first and second trajectories.

7. The system according to claim 6, wherein
   the first subsystem and the second subsystem are each configured to determine the respective safety value based on a time statement that indicates how much time would remain for taking measures to avoid a collision of a defined potential damage severity with an object in the vehicle environment when travelling along the respective trajectory.

8. The system according to claim 6, wherein
   the first subsystem and the second subsystem are each configured to determine the respective safety value based on a speed of the vehicle, a speed of a vehicle travelling in front of the vehicle, and a distance between the vehicle and the vehicle travelling in front of the vehicle.

9. A method for operating a driver assistance system of a vehicle, comprising:
   generating, using a first subsystem, a first environment model;
   planning, using the first subsystem, one or more first trajectories for the vehicle based on the first environment model;
   generating, using a second subsystem, a second environment model;

planning, using the second subsystem, one or more second trajectories for the vehicle based on the second environment model;

receiving, by the first subsystem, the one or more second trajectories from the second subsystem;

performing, using the first subsystem, a safety assessment both for the one or more first trajectories and for the one or more second trajectories using the first environment model generated by the first subsystem;

receiving, by the second subsystem, the one or more first trajectories from the first subsystem;

performing, using the second subsystem, a safety assessment both for the one or more first trajectories and for the one or more second trajectories using the second environment model generated by the second subsystem;

selecting, by a third subsystem, one of the first or second trajectories based on the safety assessments by the first subsystem and the second subsystem; and actuating one or more actuators of the vehicle to perform an at least partially automated driving maneuver according to the selected one of the first or second trajectories.

10. A non-transitory computer-readable medium comprising instructions operable, when executed by one or more computing systems, to:

generate, using a first subsystem, a first environment model;

plan, using the first subsystem, one or more first trajectories for a vehicle based on the first environment model;

generate, using a second subsystem, a second environment model;

plan, using the second subsystem, one or more second trajectories for the vehicle based on the second environment model;

receive, by the first subsystem, the one or more second trajectories from the second subsystem;

perform, using the first subsystem, a safety assessment both for the one or more first trajectories and for the one or more second trajectories using the first environment model generated by the first subsystem;

receiving, by the second subsystem, the one or more first trajectories from the first subsystem;

perform, using the second subsystem, a safety assessment both for the one or more first trajectories and for the one or more second trajectories using the second environment model generated by the second subsystem; and select one of the first or second trajectories based on the safety assessments by the first subsystem and the second subsystem; and actuate one or more actuators of the vehicle to perform an at least partially automated driving maneuver according to the selected one of the first or second trajectories.

* * * * *